United States Patent
Oh et al.

(10) Patent No.: US 8,811,139 B2
(45) Date of Patent: Aug. 19, 2014

(54) PHOTO DETECTING ELEMENT, AND OPTICAL PICK-UP AND DISC DRIVE INCLUDING THE SAME

(71) Applicant: Toshiba Samsung Storage Technology Korea Corporation, Suwon-si (KR)

(72) Inventors: Jung-bae Oh, Suwon-si (KR); Jin-ho Jeong, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/780,334

(22) Filed: Feb. 28, 2013

(65) Prior Publication Data

US 2013/0229897 A1 Sep. 5, 2013

(30) Foreign Application Priority Data

Mar. 2, 2012 (KR) .......................... 10-2012-0022035

(51) Int. Cl.
*G11B 7/00* (2006.01)

(52) U.S. Cl.
USPC ........................................................ 369/120

(58) Field of Classification Search
USPC ...................... 369/44.11, 44.14, 112.01, 120; 250/214 A
See application file for complete search history.

(56) References Cited

U.S. PATENT DOCUMENTS

| 7,002,131 | B1 * | 2/2006 | Lewis ...................... 250/214 A |
| 7,573,797 | B2 | 8/2009 | Asada et al. |
| 7,696,467 | B2 * | 4/2010 | Takiba et al. ............. 250/214 A |
| 2012/0193518 | A1 * | 8/2012 | Shimizu et al. ........... 250/214 A |

FOREIGN PATENT DOCUMENTS

| JP | 2002-042363 A | | 2/2002 | |
| JP | 2002042363 A | * | 2/2002 | ............. G11B 7/125 |
| KR | 10-2011-0109070 A | | 10/2001 | |

OTHER PUBLICATIONS

Korean Office Action issued Jan. 24, 2013 in counterpart Korean Application No. 10-2012-0022035 (4 pages in Korean).

* cited by examiner

*Primary Examiner* — Brenda Bernardi
(74) *Attorney, Agent, or Firm* — NSIP Law (57) ABSTRACT

Provided is a photo detecting element including a body with an optical sensor and an amplification unit for amplifying a signal output from the optical sensor. The photo detecting element includes a driving voltage port that applies a driving voltage to the amplification unit, a ground port that provides a ground for the amplification unit, and a plurality of output ports interposed between the driving voltage port and the ground port, and outputting a signal received from the amplification unit. The driving voltage port, ground port, and plurality of output ports are disposed on the same one side of the body.

24 Claims, 8 Drawing Sheets

PHOTO DETECTING ELEMENT, AND OPTICAL PICK-UP AND DISC DRIVE INCLUDING THE SAME

CROSS-REFERENCE TO RELATED PATENT APPLICATION

This application claims the benefit under 35 U.S.C. §119(a) of Korean Patent Application No. 10-2012-0022035, filed on Mar. 2, 2012, in the Korean Intellectual Property Office, the entire disclosure of which is incorporated herein by reference for all purposes.

BACKGROUND

1. Field

The following description relates to a photo detecting element, and an optical pick-up apparatus and an optical disc drive including the same, and more particularly, to a photo detecting element having an improved gain adjusting structure.

2. Description of Related Art

A photo detecting element, for example, a Photo Detector Integrated Circuit (PDIC) such as an optical monitoring detector used in an optical pick-up apparatus, is used to monitor the power of light output from a Laser Diode (LD) and typically includes a Photo Diode (PD) and an amplifier. A photo detecting element is typically included in an optical pick-up apparatus of an optical disk drive.

In an optical pick-up apparatus, when information is written on or read from a disc, the photo detecting element generates a monitoring output signal for power calibration and an auto power control signal for controlling light emitted by the LD towards the disc.

The photo detecting element is typically a semiconductor device into which various parts are integrated. An input signal includes a component such as an SDIO component and an SCLK component that acts as noise on a differential output signal. Typically, a port causing such noise is disposed close to a differential output port and causes the quality of an output signal to deteriorate. Alternatively, when a port to which a driving voltage Vcc is applied is disposed close to the differential output port, the LD may be damaged by an overcurrent caused by a short-circuit between the two ports.

SUMMARY

In an aspect, there is provided a photo detecting element comprising a body including an optical sensor and an amplification unit for amplifying a signal output from the optical sensor, a driving voltage port disposed on one side of the body and applying a driving voltage to the amplification unit, a ground port disposed on the one side of the body and providing a ground for the amplification unit, and a plurality of output ports interposed between the driving voltage port and the ground port on the one side of the body and outputting a signal output from the amplification unit.

The plurality of output ports may comprise a P-type differential output port and an N-type differential output port, the N-type differential output port may be disposed close to the ground port; and the P-type differential output port may be disposed close to the driving voltage port.

The photo detecting element may comprise a gain controller included in the body and controlling a gain of the amplification unit, and a plurality of control signal input ports disposed on another side of the body and applying a control signal to the amplification unit.

The plurality of control signal input ports may comprise a serial clock signal input port and a serial data input and output port.

The body may comprise four sides forming a quadrangle, the driving voltage port, the ground port and the plurality of differential output ports may be disposed on the first side of the four sides, and a serial clock signal input port and a serial data input and output port may be disposed on the third side opposite to the first side from among the four sides.

In an aspect, there is provided an optical pick-up apparatus comprising a light source, an object lens focusing light output from the light source on a disc, a main optical sensor receiving light reflected from the disc to generate an electrical signal, and a photo detecting element comprising a body including an optical sensor and an amplification unit for amplifying a signal output from the optical sensor, a driving voltage port disposed on one side of the body and applying a driving voltage to the amplification unit, a ground port disposed on the one side of the body and providing a ground for the amplification unit, and a plurality of output ports interposed between the driving voltage port and ground port on the one side of the body and outputting a signal output from the amplification unit.

The plurality of output ports may comprise a P-type differential output port and an N-type differential output port, the N-type differential output port may be disposed close to the ground port, and the P-type differential output port may be disposed close to the driving voltage port.

The optical pick-up apparatus may comprise a gain controller included in the body and controlling a gain of the amplification unit, and a plurality of control signal input ports disposed on another side of the body and applying a control signal to the amplification unit.

The plurality of control signal input ports may comprise a serial clock signal input port, and a serial data input and output port.

The body may comprise four sides forming a quadrangle, the driving voltage port, the ground port and the plurality of differential output ports may be disposed on the first side of the four sides, and a serial clock signal input port and a serial data input and output port may be disposed on the third side opposite to the first side from among the four sides.

In an aspect, there is provided an optical disc drive comprising the optical pick-up apparatus, a mechanism performing a focusing or tracking operation of the optical pick-up apparatus with respect to the disc, an information processing unit processing an output signal from the main optical sensor, and a servo unit controlling the mechanism by using the output signal.

The body may comprise four sides forming a quadrangle, the driving voltage port, the ground port and the plurality of differential output ports may be disposed on the first side of the four sides; and a serial clock signal input port and a serial data input and output port may be disposed on the third side opposite to the first side from among the four sides.

The output ports may comprise a P-type differential output port and an N-type differential output port, the N-type differential output port may be disposed close to the ground port, and the P-type differential output port may be disposed close to the driving voltage port.

The optical disc drive may comprise a gain controller included in the body and controlling a gain of the amplification unit, and a plurality of control signal input ports disposed on another side of the body and applying a control signal to the amplification unit.

The optical disc drive may comprise a first gain controller included in the body and controlling a gain for the amplification unit, and a second gain controller disposed outside the body.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
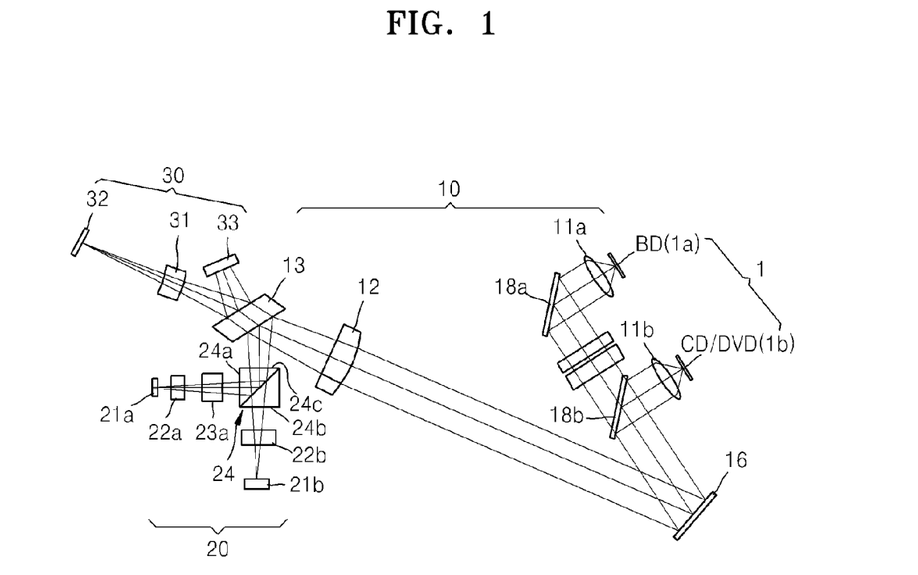
FIG. 1 is a diagram illustrating an example of an optical pick-up apparatus.

FIG. 1 illustrates an example of an optical pick-up apparatus.

Referring to FIG. 1, the optical pick-up apparatus includes an optical transmitting system 10 operating in conjunction with a medium 1 (1a and 1b), a light source system 20 providing a plurality of light beams, and a light receiving system 30 for receiving a beam reflected from the medium 1 for information reproduction.

For example, the light source system 20 may include three light beams including a main central beam, and first and second lateral sub-beams for reproducing information from the medium 1 and/or writing information to the medium 1. In this example, the light source system 20 includes a first light source 21a for a Blu-ray Disc (BD), a first diffraction element 22a for a BD, a coupling lens 23a, a second light source 21b for a Compact Disc (CD)/Digital Versatile Disc (DVD), a second diffraction element 22b for a CD/DVD, and a first beam splitter 24. The first beam splitter 24 may have a cubic structure in which beams from the first light source 21a and the second light source 21b are incident on a first surface 24a and a second surface 24b adjacent to each other.

The beams from the first light source 21a and the second light source 21b may be output in parallel from a third surface 24c facing the second surface 24b, and input to a second beam splitter 13. The coupling lens 23a may adjust an optical distance from the first light source 21a to the medium 1 (1a and 1b) by adjusting an optical magnification between the first light source 21a and the second beam splitter 13. For example, the coupling lens may adjust a defocused amount of the travelling light.

The first and second diffraction elements 22a and 22b may form a main central beam and two plus and minus first-order sub-beams by diffracting the two single light beams from the first and second light sources 21a and 21b. The main central beam and the two plus and minus sub-beams may have a polarization component (hereinafter referred to as a first polarization) of a first direction and a polarization component of a second direction (hereinafter referred to as a second polarization). The second polarization may be different from, namely, perpendicular to the first polarization. The diffraction elements 22a and 22b may change an interval between the main beam and the sub-beams according to a grating interval or a period thereof.

In this example, the optical transmitting system 10 includes an optical path refracting mirror 16, a dichroic mirror 18b, and a total reflection mirror 18a. The optical path refracting mirror 16 is for refracting an optical path of light incident from the second beam splitter 13. The dichroic mirror 18b, positioned on a travelling path of light reflected from the optical path refracting mirror 16, is for reflecting a beam of a predetermined wavelength from among the incident beams, for example, light for CD/DVD and light for BD. The total reflection mirror 18a is for reflecting the light for the BD transmitted by the dichroic mirror 18b. A first object lens 11a for BD is positioned on a travelling path of light reflected from the total reflection mirror 18a and a second object lens 11b for CD/DVD is positioned on a travelling path of light reflected from the dichroic mirror 18b.

This example further includes the optical receiving system 30 which includes an optical receiving element 32, a sensing lens 31, and a monitoring photo detecting element 33. The optical receiving element 32, having three optical receiving cells, is for receiving the three beams reflected from the medium 1. The sensing lens 31 is for focusing the three beams from the medium 1 to the optical receiving element 32, in a proper size. The monitoring photo detecting element 33, which may be a Front Photo Detector (FPD), may directly receive the beam from the light source system 20.

Figure 2:
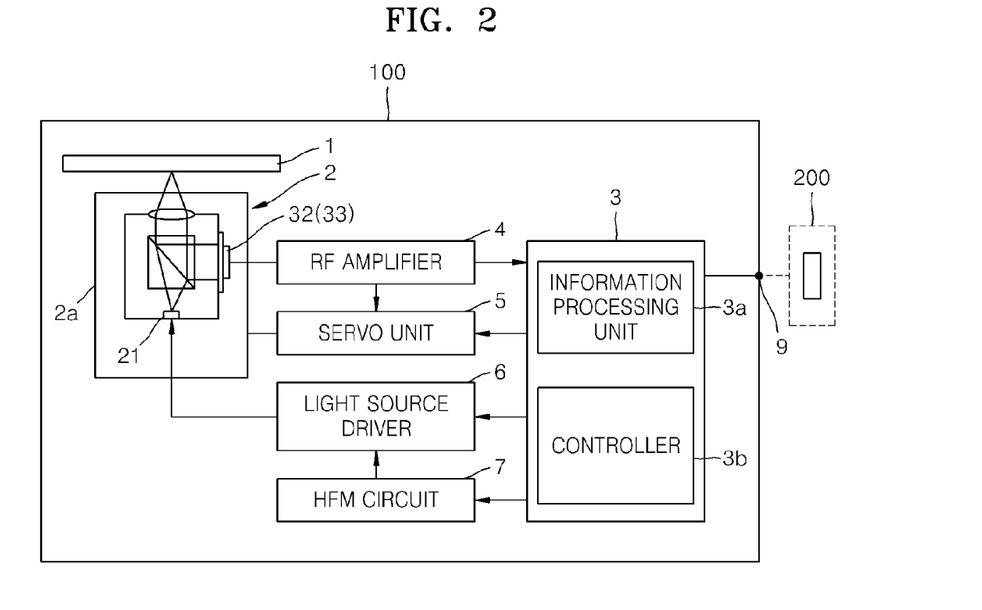
FIG. 2 is a diagram illustrating an example of an optical disc drive.

FIG. 2 illustrates an example of an optical disc drive including an optical pick-up apparatus.

Referring to FIG. 2, the optical disc drive 100 includes an optical pick-up apparatus 2 for reading information from and/or writing information to the medium 1. The optical pick-up apparatus may have the same structure as shown in FIG. 1. The optical pick-up apparatus 2 may further include a mechanical system 2a for mechanically supporting the optical system and performing a focusing and/or tracking operation of an object lens. The optical receiving sensor 32 and the photo detecting element 33 of the optical system are electrically connected to a front end part 4, which may be an integrated circuit (IC) including a Radio Frequency (RF) amplifier or the like.

In this example, the light source 21 is connected to a light source driver or an LD driver (LDD) 6. The light source driver 6 is connected to a High Frequency Modulation (HFM) circuit 7 for providing an HFM component. Meanwhile, the mechanism system 2a of the optical pick-up apparatus 2 is connected to a servo unit 5 that performs a tracking control or a focusing control for the optical pick-up apparatus 2. The front end part 4, servo unit 5, light source driver 6, and HFM circuit 7 are all connected to a digital signal processing (DSP) controller 3. The DSP controller 3 includes an information processing unit 3a including an encoder/decoder for processing a signal from the front end part 4, and a system controller 3b for controlling all the elements inside the system such as the servo unit 5, the light source driver 6, and the HFM circuit 7.

Figure 3:
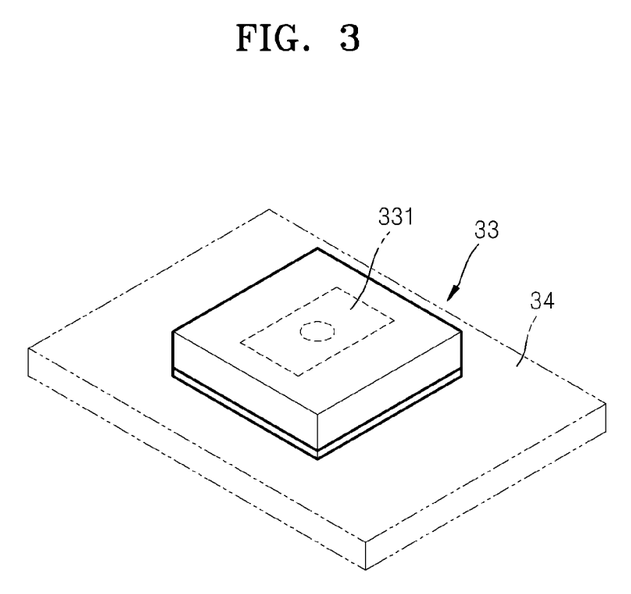
FIG. 3 is a diagram illustrating an example of a photo detecting element.
Figure 4:
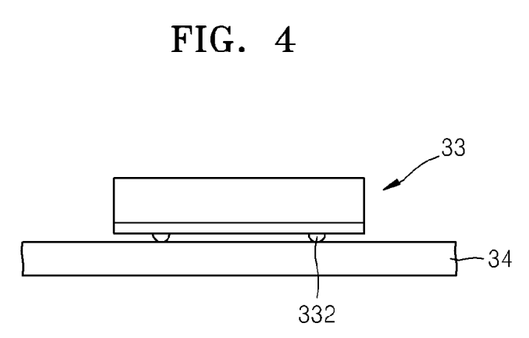
FIG. 4 is a diagram illustrating an example of a side view of the photo detecting element illustrated in FIG. 3.

FIG. 3 illustrates an example of the photo detecting element 33 for a BD as an example of the FPD described above. FIG. 4 illustrates an example of a side view the photo detecting element. The photo detecting element 33 for monitoring optical power may have a small size. For example, the photo detecting element 33 may have a cube shape with four side surfaces, may be an IC element mounted on a circuit board 34 with a solder ball 332 prepared on a bottom of the cube shape, and may include a photo diode 331 and an amplifying unit 333 for amplifying a signal from the photo diode 331.

Figure 5:
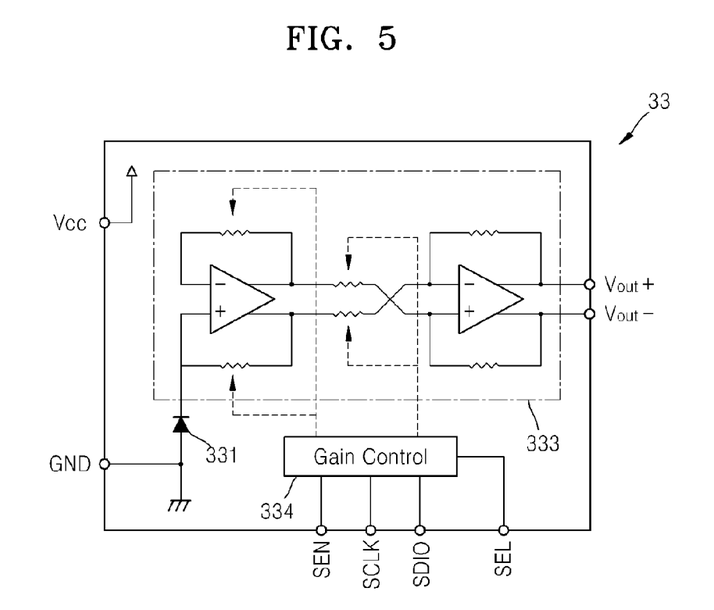
FIG. 5 is a diagram illustrating an example of an equivalent circuit diagram of the photo detecting element illustrated in FIG. 3.

FIG. 5 illustrates an example of an equivalent circuit of the photo detecting element 33. Referring to FIG. 5, the photo detecting element 33 may include a photo diode 331, an amplifying unit 333 having a plurality of operational amplifiers, and a gain controller 334 for controlling a gain. In this example, the photo detecting element 33 may include a driving voltage port Vcc for applying a voltage to the amplifying unit 333 and the gain controller 334, and a ground port GND for providing a ground path to the amplifying unit 333. The photo detecting element 33 may also include a serial enable port SEN, a serial clock input port SCLK, a serial data input and output port SDIO, a register address selection port SEL, a P-type differential output port VOUT_P for outputting a first differential signal Vout+ or FPD+, and an N-type differential output port VOUT_N for outputting a second differential signal Vout− or FPD−.

Figure 6:
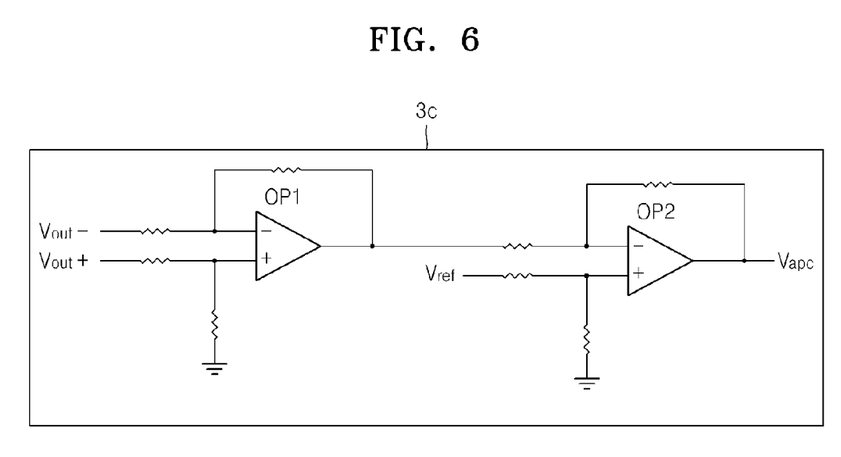
FIG. 6 is a diagram illustrating an example of an equivalent circuit diagram of an Auto Power Controller (APC) used in an optical disc drive.

FIG. 6 illustrates an example of an equivalent circuit of an Auto Power Controller (APC) 3c to which the first and second differential signals may be applied. In this example of an APC 3c, a first operational amplifier OP1, in a first stage, may operationally amplify a difference between the first and second differential signals (Vout+)−(Vout−). A second operational amplifier OP2, in a second stage, may amplify a difference between an output from the first operational amplifier OP1 and a reference voltage Vref of the APC 3c. This provides a control voltage Vapc to the light source driver 6. That is, when the difference between the differential signals, namely, the differential amplifying signal (Vout+)−(Vout−) is compared with a reference voltage Vref of the APC 3c and determined to be smaller than the reference voltage Vref, the APC 3c increases an optical power (current) of the laser diode by increasing the control voltage Vapc. Otherwise, the APC 3c decreases the optical power of the laser diode by decreasing the control voltage Vapc.

Figure 7:
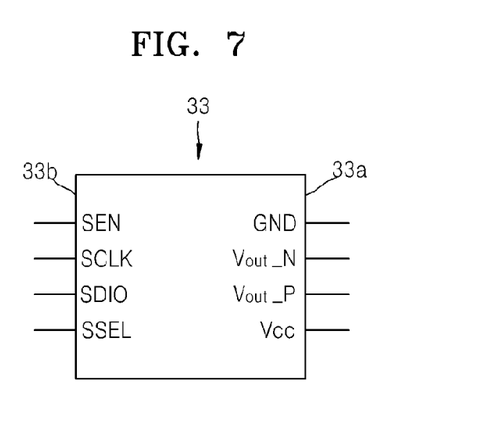
FIG. 7 is a diagram illustrating an example of a port (pin) arrangement of a photo detecting element for a Blu-ray Disc (BD)
Figure 8:
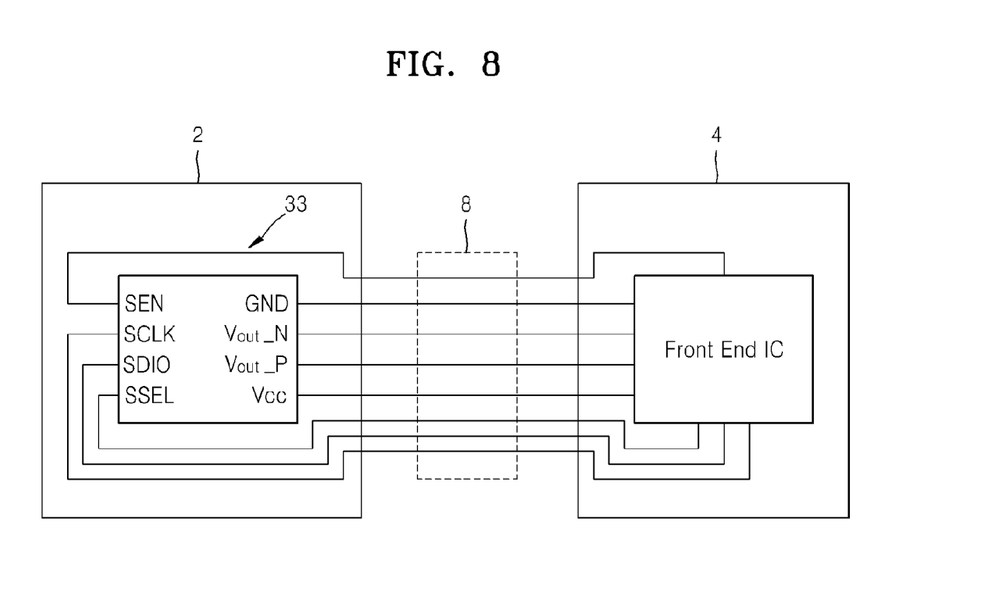
FIG. 8 is a diagram illustrating an example of a connection between the photo detecting element illustrated in FIG. 7 and a front end part.

FIG. 7 illustrates an example of an exemplary arrangement structure of ports in the photo detecting element 33, and FIG. 8 illustrates an example of a state of connection between the photo detecting element 33 and the front end part 4. Referring to FIG. 7, the photo detecting element 33 may have a quadrangular shape having four sides, and the ports may be dispersed on a first side 33a and a third side 33b opposite the first side 33a. In this example, the differential output ports Vout_P and Vout_N, the driving voltage port Vcc, and the ground port GND may be disposed on the first side 33a. On the third side 33b, the serial enable port SEN, serial clock input port SCLK, the serial data input and output port SDIO, and the register address selection port SEL may be disposed.

In this example of port arrangement structure, noise occurring from the serial data input and output port SDIO or the like is prevented from being induced to the output port by separating the output port from the input port. On the other hand, the ground port GND and the driving voltage port Vcc are separated from each other by the two differential output ports Vout_P and Vout_N. Particularly, the N-type differential output port Vout_N is adjacent to the ground port GND and the P-type differential output port Vout_P is adjacent to the driving voltage port Vcc. These ports of the photo detecting element 33 may be connected to the front end part 4 through a cable 8.

Referring to FIG. 8, a serial data input and output SDIO line causing severe noise may be separated from a P-type differential output Vout_P line with another line interposed therebetween, thereby preventing noise from the serial data input and output SDIO line from being induced to the P-type differential output Vout_P line. The noise induced to the P-type differential output Vout_P line typically interrupts an accurate and stable operation of the APC 3c.

In the described example, two differential output ports, a P-type differential output Vout_P and a N-type differential output Vout_N, may be disposed between the driving voltage port Vcc and the ground port GND prepared on the first side 33a of the photo detecting element. When the laser diode, which is a light source of the optical pick-up apparatus, is activated, the photo detecting element 33 may generate differential outputs Vout+ and Vout−. In response, if a differential amplified signal (Vout+)−(Vout−) is compared with a reference voltage Vref of the APC 3c and determined to be smaller than the reference voltage Vref, the optical power of the laser diode may be increased by increasing the current of the laser diode. Otherwise, the optical power (current) of the laser diode may be decreased.

In this example of a photo detecting element 33, if the driving voltage port Vcc and the N-type differential output port Vout_N are arranged adjacently and the P-type differential output port Vout_P and the ground port GND are arranged adjacently, the driving voltage port Vcc and the N-type differential output port Vout_N are short-circuited and the P-type differential output port Vout_P and the ground port GND are mutually short-circuited. This results in the laser diode being destroyed by an overcurrent. Supposing that the driving voltage port Vcc and the N-type differential output port Vout_N are electrically short-circuited, the differential amplified signal (Vout+)−(Vout−) in the APC 3c is reduced, and thereby the current for the laser diode is increased.

Even though the optical power of the laser diode is increased by the current increase, a level of the differential output Vout− of the photo detecting element 33 may be fixed to a level of the driving voltage Vcc. Therefore, the differential amplified signal may not reach the reference voltage Vref of the APC 3c, and a control voltage Vapc may continuously increase. Accordingly an overcurrent may flow through and destroy the laser diode.

Similarly, when the driving voltage port Vcc and the P-type differential output port Vout_P are electrically mutually short-circuited, the differential amplified signal (Vout+)−(Vout−) is reduced and a control voltage of the APC 3c increases. In response, a current flowing through the laser diode increases and the optical power thereof increases too. Although the optical power of the laser diode may increase, a level of Vout+ is identical to a level of the ground port GND because the P-type differential output port Vout_P and the ground port GND are short-circuited. Accordingly, the differential amplified signal may not reach the reference voltage Vref of the APC 3c and the control voltage Vapc continuously increases. This also results in the laser diode being destroyed by an overcurrent.

As an alternative example, if the driving voltage Vcc and the P-type differential output port Vout_P are arranged adjacently, and the N-type differential output port Vout_N and the ground port GND are also arranged adjacently, the driving voltage port Vcc and the P-type differential output port Vout_P may be short-circuited or the N-type differential output port Vout_N and the ground port GND may be short-circuited.

If the N-type differential output port Vout_N and the ground port GND become mutually short-circuited or in a current-flowing state, the differential amplified signal (Vout+)−(Vout−) may increase, and the control voltage of the APC may be reduced. In response, this thereby reduces the current for the laser diode. Accordingly, the laser diode is not destroyed even though the two ports may be short-circuited. Similarly, if the P-type differential output port Vout_P and the driving voltage port Vcc are mutually short-circuited, the differential amplified signal (Vout+)−(Vout−) may increase, and the control voltage of the APC may be reduced. In response, this thereby reduces the current for the laser diode. Therefore, the laser diode is not destroyed even though the P-type differential output port Vout_P and the driving voltage port Vcc may be short-circuited.

Figure 9:
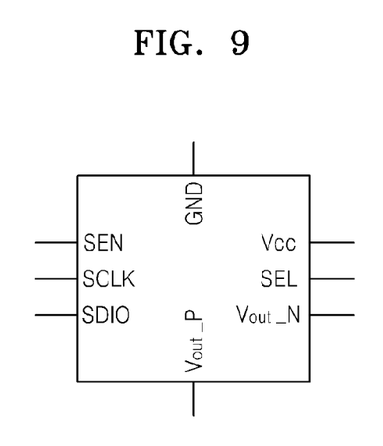
FIG. 9 is a diagram illustrating an example of a port arrangement of a photo detecting element in a related art.
Figure 10:
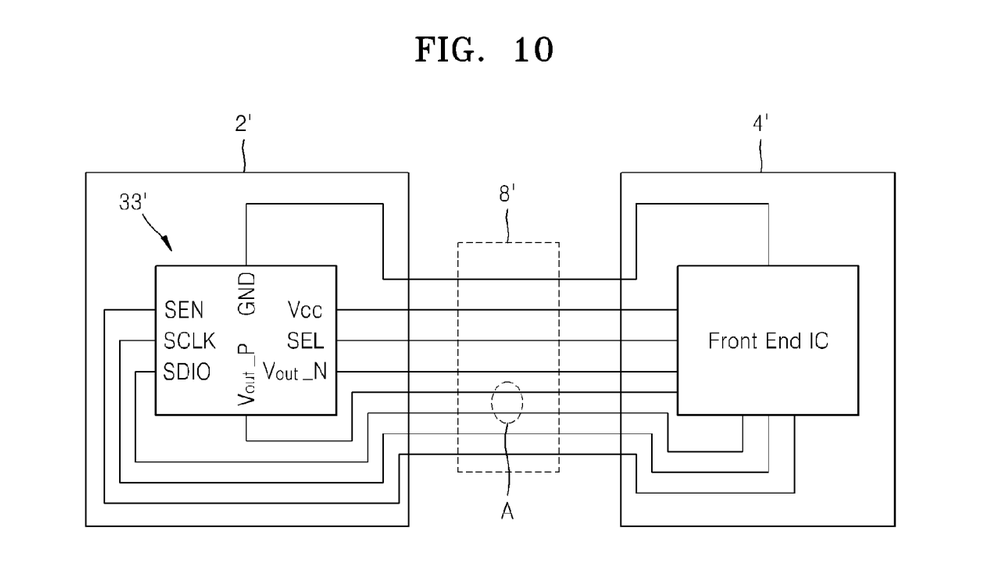
FIG. 10 is a diagram illustrating an example of a connection between the photo detecting element illustrated in FIG. 9 and a front end part.

FIG. 9 illustrates an example of an exemplary port arrangement in a photo detecting element 33' of the related art, and FIG. 10 illustrates an example of an exemplary connection structure between the related photo detecting element 33' and the front end part 4'. Referring to FIGS. 9 and 10, in this photo detecting element 33' of the related art, input and output ports are mixed. Namely, a register address selection port SEL is disposed closely to an N-type differential output port Vout_N. In addition, a serial input and output port SDIO and P-type differential output port Vout_P are disposed on sides different from but mutually adjacent to each other, and connected to the front end part 4' through a cable 8'. Here, a P-type differential output Vout_P line and a serial data input and output SDIO line directly face each other (see portion A), causing the serial input and output SDIO signal to act as noise on the P-type differential output signal Vout_P.

Accordingly, in an alternative example, deterioration of an output signal due to noise can be suppressed by separating a line to which a signal generating the noise is input from a differential output line.

Figure 11:
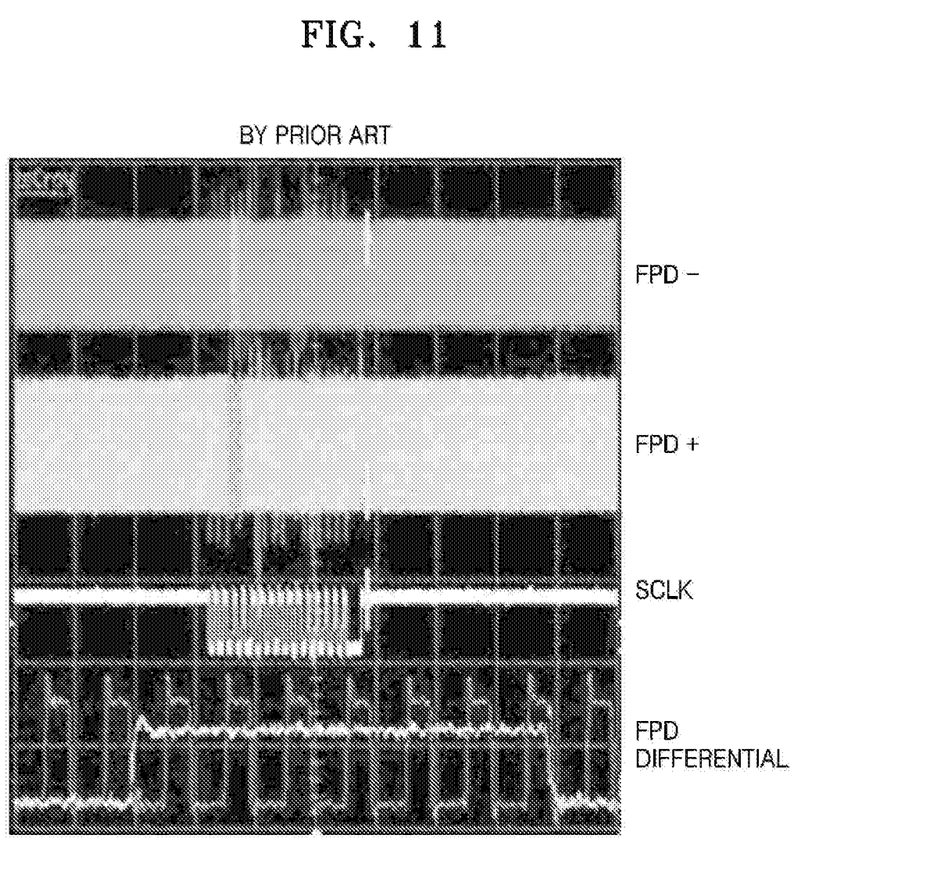
FIG. 11 is a diagram illustrating an example of a differential output of a photo detecting element in the related art.
Figure 12:
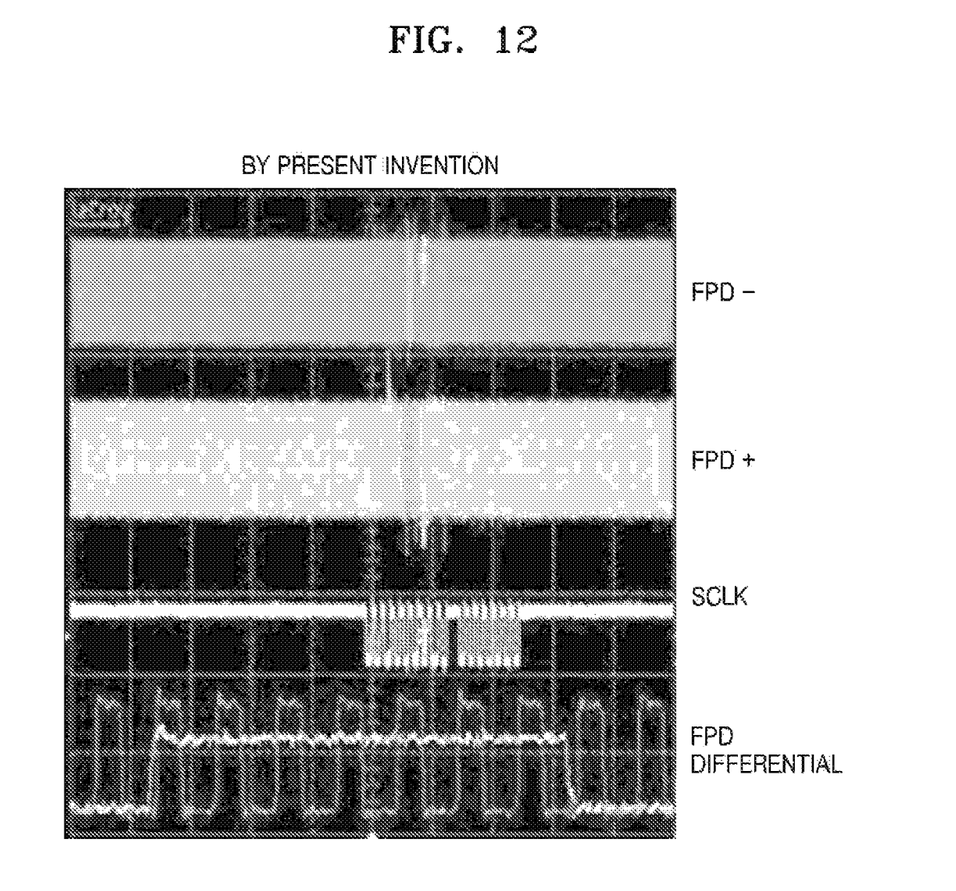
FIG. 12 is a diagram illustrating an example of a waveform of a differential output of a photo detecting element.

FIG. 11 illustrates an example of characteristics of outputs FPD− and FPG+ of the photo detecting element in the related prior art, and FIG. 12 illustrates an example of output characteristics of the photo detecting element according to the present invention. Referring to FIGS. 11 and 12, it can be noted that the characteristics of outputs FPD− and FPG+ of the photo detecting element according to the present invention are superior to the output characteristics of the photo detecting element in the related art.

Figure 13:
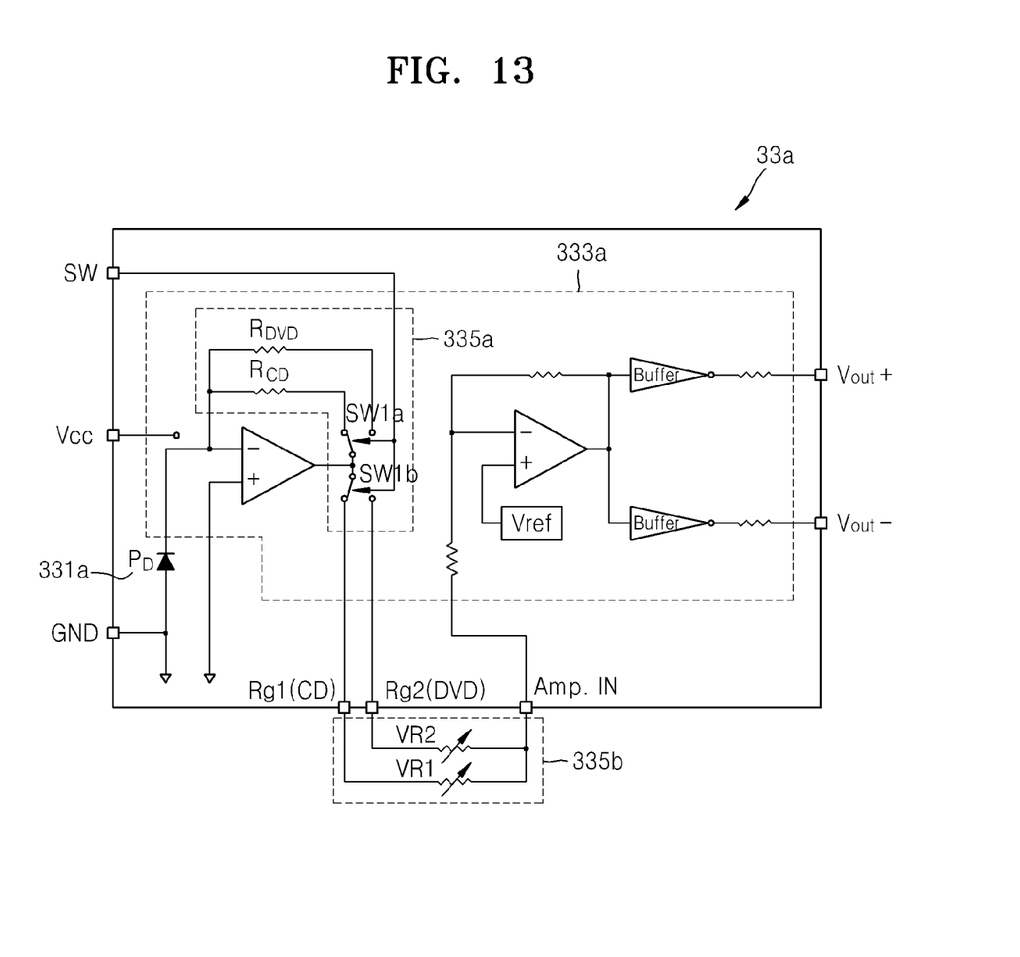
FIG. 13 is a diagram illustrating an example of an equivalent circuit diagram of a photo detecting element for a Compact Disc(CD)/Digital Versatile Disc (DVD)

The various aspects, as described above, can be applied to a photo detecting element for a CD/DVD as well as a photo detecting element for BD. FIG. 13 illustrates an example of an equivalent circuit of the photo detecting element for a CD/DVD, and FIG. 14 illustrates an example of a pin arrangement of the photo detecting element for a CD/DVD.

Referring to FIG. 13, the photo detecting element 33a may include a photo diode 331a, and an amplification unit 333a having a plurality of operational amplifiers. The amplification unit may include a first gain controller 335a, having a plurality of fixed feedback resistors Rdvd and Rcd for respectively controlling gains of CD/DVD, and selector switches SW1a and SW2a. Outside the photo detecting element 33a, a switch port SW and ports Rg1, Rg2, and Amp.IN may be disposed. The switch port SW may be for applying a selection signal to the selector switches SW1a and Sw1b, and ports Rg1, Rg2 and Amp.IN may be connected to an external second gain controller 335b. The second gain controller 335b may include variable resistors VR1 and VR2 for controlling a gain for each medium, that is, a CD or a DVD. The variable resistors VR1 and VR2 may be interposed between two operational amplifiers of the amplification unit 333a to control gains of the first and second differential signals or outputs Vout+ and Vout−.

Figure 14:
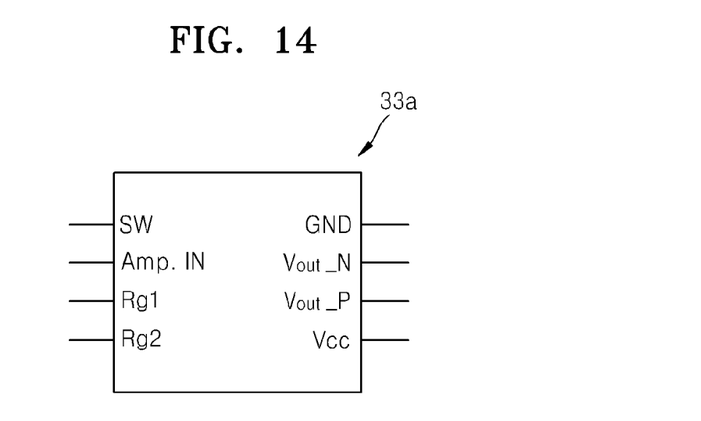
FIG. 14 is a diagram illustrating an example of a port (pin) arrangement of the photo detecting element for the CD/DVD illustrated in FIG. 13.

The ports SW, Vcc, Rg1, Rg2, Amp.IN, Vout+, Vout− and GND of the photo detecting element 33a may be arranged as shown in FIG. 14.

Referring to FIG. 14, the ground port GND and driving voltage port Vcc may be disposed on a first side of the photo detecting element, and the differential output ports Vout_N and Vout_P may be interposed therebetween. In this example, the N-type differential output port Vout_N may be disposed close to the ground port GND and the P-type differential output port Vout_P may be disposed close to the driving voltage port Vcc. Plural ports Rg1, Rg2 and Amp.IN, may be connected to the second controller 335b, and may be disposed on a third side opposite to the first side.

According to various aspects, destruction of a laser diode due to short-circuited ports can be prevented by designing a port (or pin) arrangement of the photo monitoring detector. In addition, the operational stability and reliability of the APC may be improved by preventing quality deterioration of an output signal of the photo detecting element due to noise reduction.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:
1. A photo detecting element comprising:
   a body including an optical sensor and an amplification unit configured to amplify a signal output from the optical sensor;
   a driving voltage port disposed on one side of the body and configured to apply a driving voltage to the amplification unit;
   a ground port disposed on the one side of the body and configured to provide a ground for the amplification unit; and output ports disposed on the one side of the body, interposed between the driving voltage port and the ground port on the one side of the body, and configured to output a signal received from the amplification unit,
the output ports comprising a P-type differential output port disposed directly adjacent to the driving voltage port.

2. The photo detecting element according to claim 1, wherein
the output ports further comprise an N-type differential output port disposed directly adjacent to the ground port.

3. The photo detecting element of claim 2, wherein the P-type differential output port is directly adjacent to the N-type differential output port.

4. The photo detecting element according to claim 2 further comprising:
a gain controller included in the body and configured to control a gain of the amplification unit; and
control signal input ports disposed on another side of the body and configured to apply a control signal to the amplification unit.

5. The photo detecting element according to claim 4, wherein the control signal input ports comprise a serial clock signal input port and a serial data input and output port.

6. The photo detecting element according to claim 1, wherein
the body comprises four sides forming a quadrangle;
the driving voltage port, the ground port, and the output ports are disposed on a first side of the four sides;
a serial clock signal input port and a serial data input and output port are disposed on a third side of the four sides; and
the third side is opposite to the first side.

7. The photo detecting element of claim 6, in which the serial data input and output line is disposed directly opposite the P-type differential output port.

8. The photo detecting element of claim 6, in which the serial clock input port is disposed directly opposite the N-type differential output port.

9. The photo detecting element of claim 6, wherein a serial enable port and a register address selection port are disposed on the third side.

10. The photo detecting element according to claim 2, wherein:
the body comprises four sides forming a quadrangle;
the driving voltage port, the ground port and the output ports are disposed on a first side of the four sides;
a serial clock signal input port and a serial data input and output port are disposed on a third side of the four sides; and
the third side is opposite to the first side.

11. The photo detecting element according to claim 4, wherein:
the body comprises four sides forming a quadrangle;
the driving voltage port, the ground port and the output ports are disposed on a first side of the four sides;
a serial clock signal input port and a serial data input and output port are disposed on a third side of the four sides; and
the third side is opposite to the first side.

12. The photo detecting element according to claim 5, wherein:
the body comprises four sides forming a quadrangle;
the driving voltage port, the ground port, and the output ports are disposed on a first side of the four sides;
the serial clock signal input port and the serial data input and output port are disposed on a third side; and
the third side is opposite to the first side.

13. An optical pick-up apparatus comprising:
a light source;
an object lens configured to focus light output from the light source onto a disc;
a main optical sensor configured to receive light reflected from the disc to generate an electrical signal; and
a photo detecting element comprising a body including an optical sensor and an amplification unit configured to amplify a signal output from the optical sensor, a driving voltage port disposed on one side of the body and configured to apply a driving voltage to the amplification unit, a ground port disposed on the one side of the body and configured to provide a ground for the amplification unit, and output ports disposed on the one side of the body, interposed between the driving voltage port and the ground port, and configured to output a signal received from the amplification unit,
the output ports comprising a P-type differential output port disposed directly adjacent to the driving voltage port.

14. The optical pick-up apparatus according to claim 13, wherein the output ports further comprise an N-type differential output port disposed directly adjacent to the ground port.

15. The optical pick-up apparatus according to claim 14, further comprising:
a gain controller included in the body and configured to control a gain of the amplification unit; and
control signal input ports disposed on another side of the body and configured to apply a control signal to the amplification unit.

16. The optical pick-up apparatus according to claim 15, wherein the control signal input ports comprise a serial clock signal input port, and a serial data input and output port.

17. The optical pick-up apparatus according to claim 13, wherein
the body comprises four sides forming a quadrangle;
the driving voltage port, the ground port and the output ports are disposed on a first side of the four sides;
a serial clock signal input port and a serial data input and output port are disposed on a third side of the four sides; and
the third side is opposite to the first side.

18. The optical pick-up apparatus according to claim 14, wherein:
the body comprises four sides forming a quadrangle;
the driving voltage port, the ground port and the output ports are disposed on a first side of the four sides;
a serial clock signal input port and a serial data input and output port are disposed on a third side of the four sides; and
the third side is opposite to the first side.

19. The optical pick-up apparatus according to claim 15, wherein:
the body comprises four sides forming a quadrangle;
the driving voltage port, the ground port and the output ports are disposed on a first side of the four sides;
a serial clock signal input port and a serial data input and output port are disposed on a third side of the four sides; and
the third side is opposite to the first side.

20. An optical disc drive comprising:
the optical pick-up apparatus of claim 13;
a mechanism configured to perform a focusing or tracking operation of the optical pick-up apparatus with respect to the disc;

an information processing unit configured to process an output signal from the main optical sensor; and a servo unit configured to control the mechanism by using the output signal.

21. The optical disc drive according to claim 20, wherein the body comprises four sides forming a quadrangle;

the driving voltage port, the ground port and the differential output ports are disposed on a first side of the four sides;

a serial clock signal input port and a serial data input and output port are disposed on a third side of the four sides; and the third side is opposite to the first side.

22. The optical disc drive according to claim 21, wherein the output ports further comprise an N-type differential output port disposed directly adjacent to the ground port.

23. The optical disc drive according to claim 22, further comprising:

a gain controller included in the body and configured to control a gain of the amplification unit; and control signal input ports disposed on another side of the body and configured to apply a control signal to the amplification unit.

24. The optical disc drive according to claim 21, further comprising:

a first gain controller included in the body and configured to control a gain for the amplification unit; and a second gain controller disposed outside the body.

* * * * *